Nov. 21, 1939.  J. THOMASON ET AL  2,180,621

TRAILER CRANE

Filed March 20, 1939

Inventors
Jake Thomason
By Roy Arnett
Arthur H. Sturges
Attorney

Patented Nov. 21, 1939

2,180,621

UNITED STATES PATENT OFFICE 2,180,621

TRAILER CRANE

Jake Thomason and Roy Arnett, Litchfield, Nebr.

Application March 20, 1939, Serial No. 262,940

2 Claims. (Cl. 254—4)

This invention relates to trailer vehicles and more particularly to portable cranes or the like.

It is an object of the invention to provide a trailer mechanism which may be readily attached to the draw bars of tractors or the like and to provide means whereby an object resting upon the ground may be conveniently elevated and transported, said device to be comprised of few and simple parts.

It is a particular object of the invention to provide a mechanism for the above stated purposes, the parts of which are so arranged that elongated articles, such as certain road working and maintaining implements may be readily and expeditiously transported under a carrying frame with a minimum of labor, said mechanism being comparatively short with respect to such elongated articles for permitting a turning of comparatively sharp corners of roadways.

Another object of the invention is to provide a hitch device for cooperation with the mechanism of the present invention for facilitating towing operations thereof.

Other and further objects and advantages of the invention will be understood from the following detailed description thereof, reference being had to the accompanying drawing in which.

Figure 1:
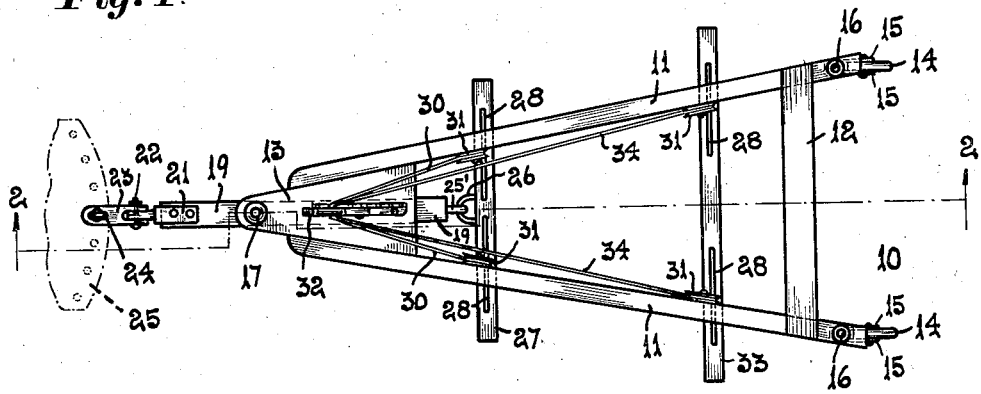
Figure 1 is a top plan view of the new device.

Referring now to the drawing for a more particular description the new device includes a frame generally indicated at 10. The frame in plan is substantially of elongated A-shape having oppositely disposed side rails 11, a transversely disposed reinforcing strut or bar 12 and a platform 13 adjacent the forward or narrower end of the frame.

The rear end of each rail 11 is supported by a wheel 14 of caster type for facilitating rearward movements of the device upon the ground. The wheels 14 are each disposed between a bifurcated leg 15. The legs 15 are provided with shafts 16 which are pivotally mounted through the rear ends of the rails 11 whereby the wheels 14 are adapted to swivel and pivotally turn in horizontal direction similar to caster wheels of conventional type.

A king-bolt 17 extends through the forward end of the platform 13, being attached thereto by any suitable means for pivotal movements. The lower end of the king-bolt 17 is bifurcated, providing legs 18 between which a tongue 19 is pivotally mounted as at 20 for vertical swinging movements, said pivot pin 20 of the towing tongue 19 being preferably disposed approximately one third of the length of said tongue 19.

The forward end of the tongue 19 is provided with a clevis 21 secured thereto by any suitable means. The forward end of the clevis is pivotally attached as at 22 to a coupling yoke 23 and the forward end of the latter is bifurcated and apertured for receiving a pin 24. The coupling yoke in conjunction with the clevis, in effect, provides a universal joint and said yoke 23 is adapted to be connected to the towing step 25 of a tractor by means of the pin 24 whereby at times when the tractor is towing the frame 10 the latter may have horizontal turning movements with respect to the tractor upon a roadway or the like.

Figure 2:
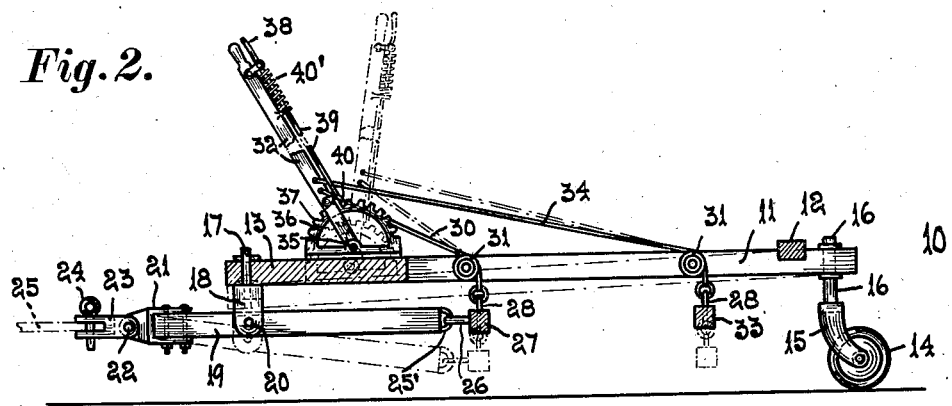
Figure 2 is a longitudinal section thereof taken substantially on line 2—2 of Figure 1.
Figure 3:
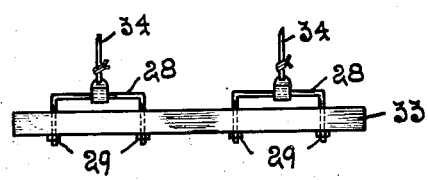
Figure 3 is a longitudinal elevation of a raising bar employed.

The rear end of the towing tongue 19 is provided with a link-eye 25' which extends through a similar eye 26, the latter being secured to a raising bar 27, as best shown in Figure 1. The bar 27 is transversely disposed with respect to the frame and, as best shown in Figure 3, a pair of U-shaped brackets 28 are oppositely disposed with respect to each other and secured adjacent opposite ends of the bar 27. The brackets 28 may extend through the bar 27 or be attached thereto by any suitable means such as the keeper nuts 29 although it will be understood that any suitable arrangement may be employed for securing the brackets 28 to the bar 27. Each bracket 28 has attached thereto a flexible wire cable, chain or similar strand 30. The strands 30, as best shown in Figure 2, extend over pulleys 31, the latter being pivotally mounted to the side rails 11 and the upper ends of the strands 30 are secured by any suitable means to a lever 32.

A similar transversely disposed bar 33 is provided between the bar 27 and the caster wheels 14, said bar 33 also being provided with brackets 28 and flexible strands 34 which extend over pulley wheels 31. The upper ends of the strands 34 are also secured to the lever 32.

The lever 32 is pivotally attached as at 35 to a vertically disposed sector 36, the latter being provided with teeth 37 upon the periphery thereof.

The lever 32 is provided with a throttle grip 38 for actuating a push-pull rod 39, the lower end of which is provided with a detent lug 40 which is adapted to be positioned between selected teeth 37 of the sector 36 by the urge of a spring 40'.

As thus described it will be noted that at times when the lever 32 is moved towards the forward end of the device, that the flexible strands 34 and 30 are provided with corresponding movements for raising the transversely disposed bars 33 and 27 and that at times when the lever 32 is moved towards the rear of the trailer that the bars 27 and 33 thereby become correspondingly lowered.

In operation and assuming that a heavy elongated implement or the like is disposed upon the ground it will be understood that the trailer may be towed into position over such article and the latter attached to and between the bars 33 and 27 by chains, ropes or the like at times when the frame 10 is lowered over said article and into contact therewith by moving the lever 32 rearwardly.

At the time the frame is lowered over the said article it will be noted that the platform end of the frame will thereby be disposed closer adjacent to the ground and the tongue 19 disposed in approximately the dotted line position thereof shown in Figure 2 with the rear end of the tongue resting on said article, the forward end of said tongue being hitched to said tractor as above described.

At this time the operator by moving the lever 32 toward the forward end of the platform thereby raises the bars 33 and 27 and with them the article to be transported together with the forward end of the frame. At this time the tongue 19 swings vertically from the pivot pin 22 of the hitch and at times when said article is clear of the ground the engine of the tractor may be started for transporting the trailer and said article. For elongated articles which are to be transported appreciable distances the forward end thereof may project under the towing step 25 of the tractor or forwardly thereof for facilitating turning acute corners at roadway crossings and the like, the pivotal mounting of the tongue 19 for turning movements in horizontal directions aiding the same whereby the device and tractor occupy a minimum of road space.

As thus described it will be noted that the new device provides means for raising an article from the ground with a minimum of effort and labor for facile transportation.

In actual practice it has been found that the herein described device is very convenient and of great advantage in elevating and carrying of mechanical equipment such as road building machinery and the like. Also our invention is adapted to support road drags useful for maintaining the surface of roads in good condition.

From the foregoing description it is thought to be obvious that an invention constructed in accordance with ours is particularly well adapted for use by reason of the convenience and facility with which it may be assembled and operated, and it will also be obvious that our invention is susceptible of some change and modification without departing from the principles and spirit thereof and for this reason we do not wish it to be understood as limiting ourselves to the precise arrangement and formation of the several parts herein shown in carrying out our invention in practice except as claimed.

What is claimed is:

1. A trailer-crane for transporting articles thereunder, comprising a frame of A-shape in plan, wheels at the wider end of said frame for supporting said end above a roadway, a tongue pivotally connected for vertical and horizontal swinging movements under and to the other end of said frame, a universal-joint towing hitch secured to one end of said tongue adapted to be pivotally connected to a tractor for towing said frame and holding said end of said tongue elevated above said roadway, a plurality of spaced apart bars transversely disposed under said frame between said tongue and wheels, a link connection between the other end of said tongue and one of said bars, and means including flexible strands connected to each bar for raising said bars and the narrower end of said frame at times when said end is hitched to said tractor for a transportation of an article removably attached to said bars under said frame.

2. A trailer-crane for transporting articles thereunder comprising a frame, a pair of oppositely disposed caster-wheels carried by said frame at one end thereof, a towing-tongue pivotally connected for vertical and horizontal swinging movements at the other end of said frame, a towing hitch carried at one end of said tongue for attaching said frame to a tractor and maintaining said end of said tongue elevated when hitched, a plurality of spaced apart bars transversely disposed with respect to and under said frame between said tongue and wheels, a lever pivotally carried by said frame for vertically swinging movements, means for preventing said swinging movements of said lever, flexible strands having ends secured to said lever and bars, and a link connection between the other end of said tongue and one of said bars.

JAKE THOMASON.
ROY ARNETT.